(12) United States Patent
Eichhorn et al.

(10) Patent No.: US 10,562,047 B2
(45) Date of Patent: Feb. 18, 2020

(54) COATING AGENT VALVE

(71) Applicant: Dürr Systems AG, Bietigheim-Bissingen (DE)

(72) Inventors: Jens Eichhorn, Bietigheim-Bissingen (DE); Steffen Sotzny, Oberstenfeld (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 56 days.

(21) Appl. No.: 15/738,587

(22) PCT Filed: Jul. 1, 2016

(86) PCT No.: PCT/EP2016/001128
§ 371 (c)(1),
(2) Date: Dec. 21, 2017

(87) PCT Pub. No.: WO2017/008887
PCT Pub. Date: Jan. 19, 2017

(65) Prior Publication Data
US 2018/0185858 A1    Jul. 5, 2018

(30) Foreign Application Priority Data

Jul. 13, 2015    (DE) .................. 10 2015 009 046

(51) Int. Cl.
*B05B 12/14*    (2006.01)
*B05B 1/30*    (2006.01)
(Continued)

(52) U.S. Cl.
CPC .......... *B05B 1/3093* (2013.01); *B05B 1/3026* (2013.01); *B05B 12/1409* (2013.01);
(Continued)

(58) Field of Classification Search
CPC ... B05B 12/149; B05B 7/1404; B05B 1/3026; B05B 1/3093; F16K 11/074
See application file for complete search history.

(56) References Cited

U.S. PATENT DOCUMENTS 3,201,048 A * 8/1965 Gibbs ................ B05B 12/1409
239/422
3,412,939 A    11/1968 Shaffer
(Continued)

FOREIGN PATENT DOCUMENTS

CH        531900 A     12/1972
CN     104613205 A      5/2015
(Continued)

OTHER PUBLICATIONS

International Search Report and Written Opinion for PCT/EP2016/001128 dated Sep. 30, 2016 (10 pages; with English translation).
(Continued)

*Primary Examiner* — Matthew W Jellett
*Assistant Examiner* — Christopher D Ballman
(74) *Attorney, Agent, or Firm* — Bejin Bieneman PLC

(57) ABSTRACT

The disclosure relates to a coating agent valve for controlling a stream of a coating agent in an application device, in particular in an atomiser, having a movable valve element (2) which controls the stream of coating agent dependent on its position. The disclosure provides for the valve element (2) to be rotatable.

20 Claims, 12 Drawing Sheets

(51) Int. Cl.
*F16K 11/074* (2006.01)
*B05B 7/14* (2006.01)

(52) U.S. Cl.
CPC ........... *F16K 11/074* (2013.01); *B05B 7/1404* (2013.01); *B05B 12/149* (2013.01)

(56) References Cited

U.S. PATENT DOCUMENTS

| | | | |
|---|---|---|---|
| 3,674,205 A | 7/1972 | Kock | |
| 3,782,632 A * | 1/1974 | Braun | ................... B05B 7/1404 239/112 |
| 4,549,676 A * | 10/1985 | Gerich | ................. B29B 7/7438 222/145.6 |
| 4,726,237 A * | 2/1988 | Yung | .................. G01N 35/1097 73/863.73 |
| 6,305,884 B1 * | 10/2001 | Lewis | ................... B05B 7/1404 406/107 |
| 6,991,180 B1 | 1/2006 | Donatti | |
| 7,140,559 B2 * | 11/2006 | Giulano | .............. B05B 12/1409 239/436 |
| 9,061,310 B2 * | 6/2015 | Seiz | ....................... B05B 12/149 |
| 9,707,585 B2 * | 7/2017 | Reimert | .............. B05B 12/1481 |
| 10,035,161 B2 * | 7/2018 | Robert | ................. F16K 31/1221 |
| 10,150,119 B2 * | 12/2018 | Henon | .................... B01L 3/567 |
| 2002/0166899 A1 * | 11/2002 | Van der Steur | ....... B05B 12/149 239/125 |
| 2013/0248000 A1 * | 9/2013 | Killeen | ..................... F17D 3/00 137/14 |
| 2015/0217317 A1 * | 8/2015 | Krogedal | ............... B05B 12/006 73/40.5 R |

FOREIGN PATENT DOCUMENTS

| | | |
|---|---|---|
| DE | 195 24 853 A1 | 1/1996 |
| DE | 10 2007 018 064 A1 | 10/2008 |
| DE | 10 2010 056 071 A1 | 6/2012 |
| DE | 10 2013 006 219 A1 | 10/2014 |
| DE | 102013006219 A1 * | 10/2014 ......... B05B 12/1481 |
| EP | 3006114 A1 | 4/2016 |

OTHER PUBLICATIONS

State Intellectual Property Office of the People's Republic of China Search Report for Application No. CN201680041351.4 dated Mar. 28, 2019 (9 pages; with English translation).

* cited by examiner

| Valve position and function: | paint duct F1: | return means RF1: | paint duct F2: | return means RF2: | diluent [sic] V: |
|---|---|---|---|---|---|
| painting with paint 1 and flushing + reloading with paint 2 (Fig. 1A - 1C) | painting | blocked | flushing/reloading in return means RF2 | flushing/reloading from paint duct F2 | blocked |
| flushing + reloading of paint 2 (Fig. 2A - 2C) | blocked | blocked | flushing/reloading in return means RF2 | flushing/reloading from paint duct F2 | blocked |
| flushing of paint nozzle and bell cup (Fig. 3A - 3C) | blocked | blocked | blocked | blocked | flushing of paint nozzle and bell cup |
| flushing + reloading of paint 1 (Fig. 4A - 4C) | flushing/reloading in return means RF1 | flushing/reloading from paint duct F1 | blocked | blocked | blocked |
| painting with paint 2 and flushing + reloading with paint 1 (Fig. 5A - 5C) | flushing/reloading in return means RF1 | flushing/reloading from paint duct F1 | painting | blocked | blocked |

Fig. 6

COATING AGENT VALVE

CROSS-REFERENCE TO RELATED APPLICATIONS

This application is a national stage of, and claims priority to, Patent Cooperation Treaty Application No. PCT/EP2016/001128, filed on Jul. 1, 2016, which application claims priority to German Application No. DE 10 2015 009 046.1, filed on Jul. 13, 2015, which applications are hereby incorporated herein by reference in their entireties.

The disclosure relates to a coating agent valve for controlling a stream of a coating agent in an application device, in particular in an atomiser (e.g. rotary atomiser).

BACKGROUND

In modern painting installations for painting motor vehicle body components, rotary atomisers are usually used as application devices. To control the stream of paint, such rotary atomisers as a rule have a main needle valve which contains a slidable valve needle which is usually driven pneumatically as valve element.

What is disadvantageous about such a main needle valve is the fact that only a single stream of paint can be controlled. When changing paints, therefore, first of all the paint line has to be flushed and filled with the new paint, which is also referred to as reloading. This flushing and reloading takes a relatively long time, during which the rotary atomiser cannot be used for applying paint.

One further disadvantage of the known main needle valves is caused by the fact that the valve needle upon closing of the main needle valve is pressed into the valve seat in the direction of flow of the paint, as a result of which there may be a subsequent application of pressure on the paint, i.e. upon a closing operation spattering or dripping of paint may occur, which is undesirable.

With regard to the prior art, reference should also be made to DE 10 2013 006 219 A1, DE 10 2007 018 064 A1, DE 10 2010 056 071 A1, DE 195 24 853 A1 and DE 3 674 205.

BRIEF DESCRIPTION OF DRAWINGS

FIG. 6 shows a table clarifying the technical function of the various rotary positions.

DETAILED DESCRIPTION

Figure 1A:
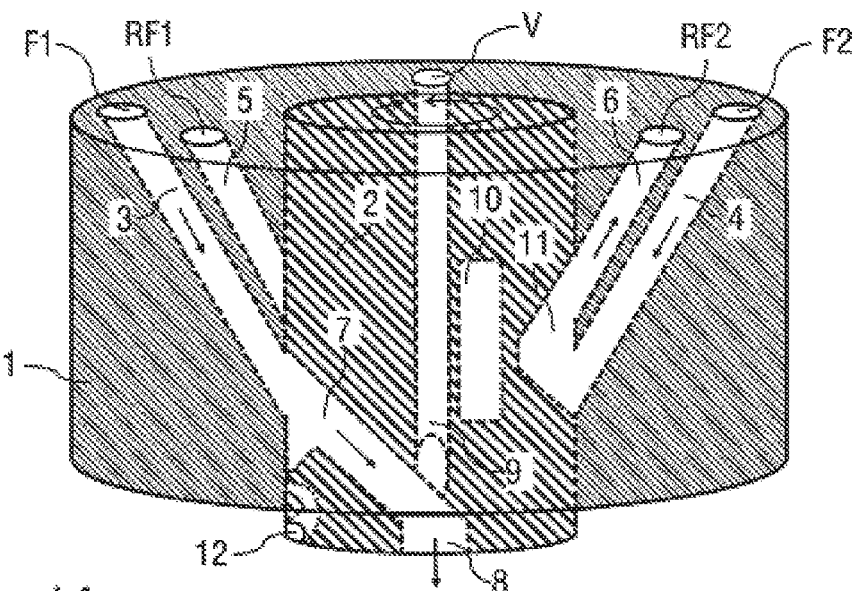
FIG. 1A is a schematic perspective view of a coating agent valve according to the disclosure in a first rotary position for painting with a first paint and for flushing or reloading a second paint.

The coating agent valve according to the disclosure first of all, in line with the known main needle valves, has an adjustable valve element which controls the stream of coating agent dependent on the position of the valve element. In contrast to the known main needle valves, the valve element in this case is however not slidable, or at least not only slidable but rotatable. This is advantageous because thereby upon a closing operation of the coating agent valve the troublesome spattering or dripping of coating agent described above does not occur. A further advantage of such a rotatable arrangement consists in that the coating agent valve can be realised in a small space and does not require a long main needle.

In an example, the coating agent valve has two coating agent inlets in order to be able to supply two different coating agents. Furthermore, the coating agent valve may have a coating agent outlet in order to dispense either the first coating agent or the second coating agent. The rotatable valve element in this case therefore, dependent on its rotary position, selects either the first coating agent or the second coating agent, and guides it to the common coating agent outlet. The rotatable valve element therefore connects the coating agent outlet either to the first coating agent inlet or to the second coating agent inlet, dependent on its rotary position. In this manner, the coating agent valve according to the disclosure permits not only control (ON/OFF) of the stream of coating agent, but also the selection of one of several coating agents, so that the coating agent valve according to the disclosure also fulfils the function of a paint changer.

In an example, the coating agent valve has precisely two coating agent inlets in order to be able to supply two different coating agents. However, in the context of the disclosure there is in principle also the possibility of the coating agent valve according to the disclosure having more than two coating agent inlets, for example three or four coating agent inlets, in order to be able to select from among a correspondingly larger number of different paints.

In an example, the coating agent valve preferably has a first return means and a second return means, the two return means being associated with the two coating agent inlets and permitting returning of the respective coating agent. In the case of a larger number of coating agent inlets, then a correspondingly larger number of return means can also be provided, so that one return means in each case is also associated with each coating agent inlet.

The rotatable valve element either connects the first return means to the first coating agent inlet or blocks off the first return means dependent on its rotary position.

In the same way, the rotatable valve element either connects the second return means to the second coating agent inlet or blocks off the second return means dependent on its rotary position.

The coating agent valve according to the disclosure therefore permits circulation of material through the coating agent valve, the circulation of material into the respective return means being able to be either enabled or blocked off by the rotatable valve element.

In an example, the coating agent valve additionally has a flushing agent inlet via which a flushing agent can be supplied, with the rotatable valve element either blocking off the flushing agent inlet or connecting it to the coating agent outlet and the duct for externally flushing the bell cup. When applying paint, the rotatable valve is then turned such that the flushing agent inlet is blocked off, since then no flushing agent is required. When changing paints, the rotatable valve element is then turned such that the flushing agent inlet is connected to the coating agent outlet, so that the flushing agent waiting on the input side is dispensed via the coating agent outlet, in order for example to flush a paint nozzle and/or a bell cup of a rotary atomiser, as will be described in detail later.

In an example, the rotatable valve element can be turned into different rotary positions which have different functions. For example, the coating agent valve according to the disclosure can fulfil the following functions in the following rotary positions:

rotary position 1: painting with paint 1 and simultaneously flushing and reloading a paint 2.
rotary position 2: only flushing and reloading with paint 2.
rotary position 3: only flushing of paint nozzle and bell cup.
rotary position 4: only flushing and reloading of paint 1.
rotary position 5: flushing and reloading of paint 1 and simultaneously painting with paint 2.

In the above-mentioned first rotary position (painting with paint 1 and simultaneously flushing and reloading of paint 2) of the rotatable valve element, the rotatable valve element then connects the first coating agent inlet to the coating agent outlet, in order to apply the first coating agent (paint 1). The first return means is then however blocked off by the rotatable valve element, since upon application of the first paint no material circulation of the first paint is required. Furthermore, the rotatable valve element in this rotary position connects the second coating agent inlet to the second return means, in order to be able to reload the second coating agent (paint 2). Finally, the rotatable valve element in this rotary position blocks off the flushing agent inlet, since no flushing operation is to take place.

In the above-mentioned second rotary position (only flushing and reloading with paint 2), the rotatable valve element on the other hand blocks off the first coating agent inlet and the first return means. On the other hand, the rotatable valve element in this rotary position connects the second coating agent inlet to the second return means in order to reload the second coating agent. Finally, the rotatable valve element in this rotary position also blocks off the flushing agent inlet since no flushing agent is required.

In the above-mentioned third rotary position (only flushing of paint nozzle and bell cup) of the rotatable valve element, on the other hand, both coating agent inlets and both return means are blocked off, whereas the flushing agent inlet is connected to the coating agent outlet, in order to deliver flushing agent on the output side, for example for flushing a paint nozzle and/or a bell cup of a rotary atomiser.

In the above-mentioned fourth rotary position (only flushing and reloading of paint 1) of the rotatable valve element, the valve element on the other hand connects the first coating agent inlet to the first return means, in order to be able to reload the first coating agent. The second coating agent inlet, the second return means and the flushing agent inlet on the other hand are blocked off in this rotary position.

In the above-mentioned fifth rotary position (flushing and reloading of paint 1 and simultaneously painting with paint 2) of the rotatable valve element, the valve element on the other hand connects the first coating inlet to the first return means, in order to be able to reload the first coating agent. The second coating agent inlet on the other hand in this rotary position is connected to the coating outlet, in order to be able to apply the second coating agent. In this rotary position, the second return means and the flushing agent inlet on the other hand are blocked off.

With regard to the design of the coating agent valve according to the disclosure in practice, it should be mentioned that the rotatable valve element is preferably shaped substantially cylindrically and is arranged rotatably in a hollow-cylindrical paint tube. The external diameter of the rotatable valve element in this case preferably corresponds to the internal diameter of the hollow-cylindrical paint tube.

In this case, the first coating agent inlet may feed a first coating agent duct which runs in the wall of the paint tube. The first return means on the other hand is preferably fed from a second coating agent duct which runs in the wall of the paint tube. The second coating agent inlet on the other hand may feed a third coating agent duct, which likewise runs in the wall of the paint tube. Further, the second return means may be fed through a fourth coating agent duct which runs in the wall of the paint tube. Furthermore, a fifth coating agent duct, which is connected on the input side to the flushing agent inlet, may run in the wall of the paint tube. Finally, it should be mentioned that the coating agent outlet may be arranged in the rotatable valve element, in particular centrally.

The coating agent ducts for supplying and returning the individual coating agents preferably open into the inner wall of the hollow paint tube. In this case, it should be mentioned that the coating agent duct and the return means for the first coating agent may open into the inner wall of the paint tube at the same angle at circumference, but axially offset relative to one another. In the same way, the coating agent ducts for supplying and returning the second coating agent duct may also open into the inner wall of the paint tube at the same angle at circumference, but axially offset relative to one another. The orifice openings for the coating agent ducts (return or supply) of the various coating agents in this case are preferably arranged offset over the periphery.

In the rotatable valve element there may be arranged a branch bore, which starts from the outer casing surface of the valve element and opens into the common coating agent outlet. The branch bore in this case is arranged in the valve element such that its orifice opening in the casing surface of the rotatable valve element coincides either with the orifice opening of the coating agent duct for the first coating agent or with the orifice opening of the coating agent duct for the second coating agent in the inner wall of the hollow paint tube. The branch bore can therefore be connected with one of the paint feed lines as desired dependent on the rotary position of the rotatable valve element.

It has already been mentioned above that the orifice openings of the coating agent ducts for supplying and returning paint are arranged preferably axially offset relative to one another in the inner wall of the paint tube. In the casing surface of the rotatable valve element there may be one recess in each case which extends in the axial direction and permits connection of the axially offset orifice openings in the inner wall of the hollow paint tube. In this manner, circulation of material through the coating agent valve can be enabled in that the rotatable valve element is turned such that the recess lies in the inner wall of the paint tube in the region of the two axially offset orifice openings. The respective paint can then flow into the recess and flow back out of the recess again into the associated return means.

Furthermore, it has already been mentioned above that the rotatable valve element can be turned such that the flushing agent inlet is connected to the coating agent outlet, so that flushing agent is dispensed at the exit, in order to flush for example a paint nozzle or a bell cup. Furthermore, the rotatable valve element preferably has a separate flushing agent outlet in order to deliver flushing agent, for example for external flushing of a bell cup of a rotary atomiser. This separate flushing agent outlet may be connected to the above-mentioned branch bore in the rotatable valve element and is fed with the flushing agent therefrom. The separate flushing agent outlet in the rotatable valve element may for example be connected to an external flushing duct of a rotary atomiser in order to guide the flushing agent onto the outer casing surface of the bell cup. Such external flushing ducts are known per se from the prior art, and therefore do not need to be described in greater detail.

Furthermore, the coating agent valve according to the disclosure may also comprise a valve drive in order to turn the rotatable valve element into the desired rotary position. For example, the valve drive may operate electrically, pneumatically or hydraulically.

In an example, the valve drive however operates pneumatically and has for this purpose a drive chamber into which control air can be introduced in order to turn the rotatable valve element into the desired rotary position. In the drive chamber there is pivotably arranged a pivoting vane, the pivoting vane being connected mechanically to the rotatable valve element, so that turning of the pivoting vane also turns the valve element. The pivoting vane in the drive chamber can then be subjected to compressed air either on the one side or on the other side, in order to turn the pivoting vane and hence also the rotatable valve element either in the one or in the other direction. To this end, two control air ports may open into the drive chamber on the opposing sides of the pivoting vane.

Furthermore, the valve drive according to the disclosure may have a plurality of angle-of-rotation stops which limit the pivot angle of the pivoting vane and hence also the angle of rotation of the rotatable valve element in each case to specified angular positions, the angular positions corresponding to the different functional rotary positions of the rotatable valve element which are described above. In an example, the angle-of-rotation stops can be activated and deactivated in each case, the angle-of-rotation stops in an activated position limiting the pivot angle of the pivoting vane, whereas the angle-of-rotation stops in a deactivated position do not limit the pivot angle of the pivoting vane. For example, the angle-of-rotation stops may in each case have a slider which in the activated position is pushed into the drive chamber and thereby blocks the pivoting vane, whereas the slider in the deactivated position is drawn out of the drive chamber and then does not block the pivoting vane.

It is already apparent from the foregoing description that the coating agent valve according to the disclosure may be formed as a shuttle valve with a common outlet and a plurality of inlets, the coating agent valve connecting one of the inlets to the common outlet as desired.

Finally, it should be mentioned that the disclosure is not restricted to the coating agent valve described above as an individual component. Rather, the disclosure also claims protection for a complete application device (e.g. rotary atomiser) for applying a coating agent, the application device according to the disclosure being equipped with the coating agent valve according to the disclosure described first hereinbefore. The coating agent valve according to the disclosure in this case preferably serves as the main valve and controls the delivery of coating agent. This means that there is no further requirement of a valve downstream after the main valve. Use of the coating agent valve according to the disclosure as the main valve in an application device (e.g. rotary atomiser) offers the advantage that no additional short flushing valve is necessary in order to flush the line volume downstream after the coating agent valve.

FIGS. 1A-5C show different representations and different rotary positions of a coating valve according to the disclosure, which can be used as the main valve for example in a rotary atomiser.

The table in FIG. 6 here explains the different technical functions of the individual rotary positions of the coating agent valve, which will be described in detail later below.

FIGS. 1A, 2A, 3A, 4A and 5A show in each case a schematic perspective view of the coating agent valve according to the disclosure in the different rotary positions.

FIGS. 1B, 2B, 3B, 4B and 5B on the other hand show in each case a view in cross-section through the coating agent valve according to the disclosure in the different rotary positions.

FIGS. 1C, 2C, 3C, 4C and 5C on the other hand show a simplified view of the pneumatic valve drive according to the disclosure in the different rotary positions.

The coating agent valve first of all has a hollow-cylindrical paint tube 1 in which a cylindrical valve element 2 is rotatably arranged.

In the paint tube 1 there are two paint inlets F1, F2 via which differently-coloured paints can be supplied. The two paint inlets F1, F2 open in each case into paint ducts 3 or 4 respectively, which run in the wall of the paint tube 1 obliquely to the longitudinal axis and finally open out into the inner wall of the hollow-cylindrical paint tube 1.

Furthermore, there are in the paint tube 1 two return outlets RF1 and RF2 respectively for returning the paints in the context of a circulation of material. The return outlets RF1, RF2 are fed from two return ducts 5 and 6 respectively which run in the wall of the paint tube 1. The return ducts 5, 6 run in the wall of the paint tube 1 obliquely to the longitudinal axis and open out in the inner wall of the hollow-cylindrical paint tube 1.

The orifice opening of the paint duct 3 in the inner wall of the paint tube 1 is in this case arranged at the same angle at circumference as the orifice opening of the return duct 5, but axially offset thereto.

In the same way, the orifice opening of the paint duct 4 is also arranged in the inner wall of the paint tube 1 at the same angle at circumference as the orifice opening of the return duct 6, but axially offset thereto.

In the rotatable valve element 2 there runs a branch bore 7 to an outlet 8, with paint or flushing agent being able to be delivered to the paint nozzle of the rotary atomiser via the outlet 8. The branch bore 7 opens in the outer casing surface of the rotatable valve element 2 at the axial position in which the paint duct 3 or the paint duct 4 also opens out. This means that the branch bore 7, given a suitable rotary position of the rotatable valve element 2, can effect a fluid connection either with the paint duct 3 or with the paint duct 4.

In the wall of the paint tube 1 there also runs a flushing agent duct 9 which is fed from a flushing agent inlet V. The flushing agent duct 9 likewise runs obliquely to the longitudinal axis and finally opens out in the inner wall of the paint tube 1, namely in the axial direction somewhat below the orifice openings of the paint duct 3 and of the paint duct 4. Upon appropriate rotation of the rotatable valve element 2, the branch bore 7 can then effect a fluid connection with the flushing agent duct 9, so that flushing agent can flow from the flushing agent inlet V to the outlet 8.

In the outer casing surface of the rotatable valve element 2 there are two recesses 10, 11 which extend in the axial direction and cover the axial distance between the orifice openings of the paint duct 4 and of the return duct 1 and the axial distance between the orifice openings of the paint duct 3 and the return duct 5. Upon suitable rotation of the rotatable valve element 2, the recesses 10, 11 permit a fluid connection between the paint duct 3 and the return duct 5 or between the paint duct 4 and the return duct 6, respectively, as will be described later.

Further, a separate flushing agent outlet 12 is provided in the rotatable valve element 2, which outlet can be fed with flushing agent from the branch bore 7, the flushing agent outlet 12 opening into an external flushing duct of the rotary atomiser.

Furthermore, the representations show a pneumatic valve drive for turning the rotatable valve element into the desired rotary position.

The pneumatic valve drive has a plurality of angle-of-rotation stops 20, 21, 22 which can either be activated or deactivated.

Furthermore, the pneumatic valve drive has two drive air inlets 23, the two drive air inlets 23 opening into a drive chamber 24 in which a pivoting vane 25 is pivotable, the pivoting vane 25 acting on a valve shaft 26 which is connected mechanically to the rotatable valve element 2. If pressure acts on the drive air inlet 23 shown on the right in the drawings, the pivoting vane 25 is turned anticlockwise in the drawings. If pressure acts on the drive air inlet 23 shown on the left in the drawings, the pivoting vane 25 on the other hand is therefore turned clockwise in the drawings.

The pivot angle of the pivoting vane 25 may in this case be limited by means of the angle-of-rotation stops 20-22 by activating the desired angle-of-rotation stop 20-22. Thereupon, a slider then moves radially inwards into the drive chamber 24 and thereby limits the angle of rotation of the pivoting vane. In the drawing according to FIG. 1C, the angle-of-rotation stop 20 is activated, whereas the angle-of-rotation stops 21, 22 are deactivated. In the drawing according to FIG. 3C, on the other hand, all the angle-of-rotation stops 20-22 are activated.

Below, the technical functions of the different rotary positions of the rotatable valve element 2 will now be described, with reference being made to the table according to FIG. 6.

Figure 1B:
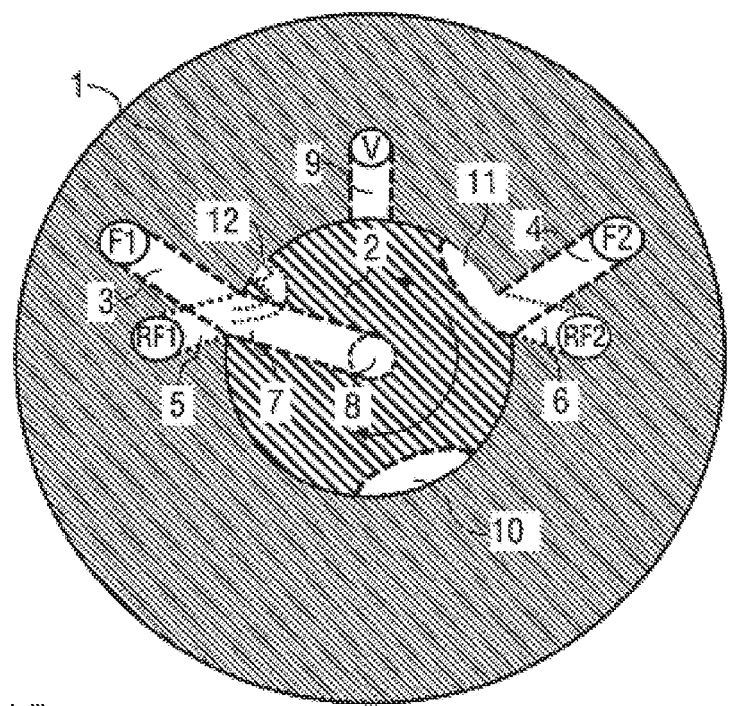
FIG. 1B is a view in cross-section through the coating agent valve in the rotary position of FIG. 1A.
Figure 1C:
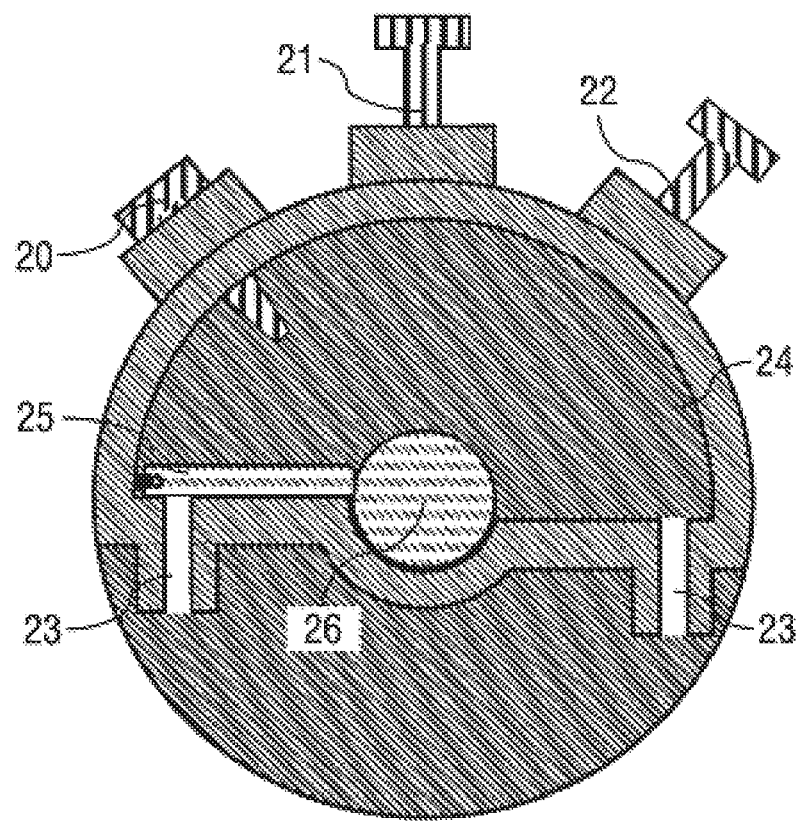
FIG. 1C is a schematic representation of the pneumatic valve drive in the rotary position according to FIGS. 1A and 1B.

FIGS. 1A-1C show a first rotary position of the valve element 2 which serves to apply paint via the paint inlet F1, whereas it is possible to flush and reload with a new paint via the paint inlet F2 and the return outlet RF2.

The rotatable valve element 2 is then turned such that the branch bore 7 in the rotatable valve element 2 effects a fluid connection with the paint duct 3. This means that paint can flow from the paint inlet F1 through the paint duct 3 and the branch bore 7 to the outlet 8.

The return duct 5 is then however blocked off by the casing surface of the rotatable valve element 2.

In this rotary position, the recess 11 in the casing surface of the rotatable valve element 2 effects a fluid connection between the paint duct 4 and the return duct 6, so that it is possible to flush and reload with new paint via the paint duct 4 and the return duct 6.

Figure 2A:
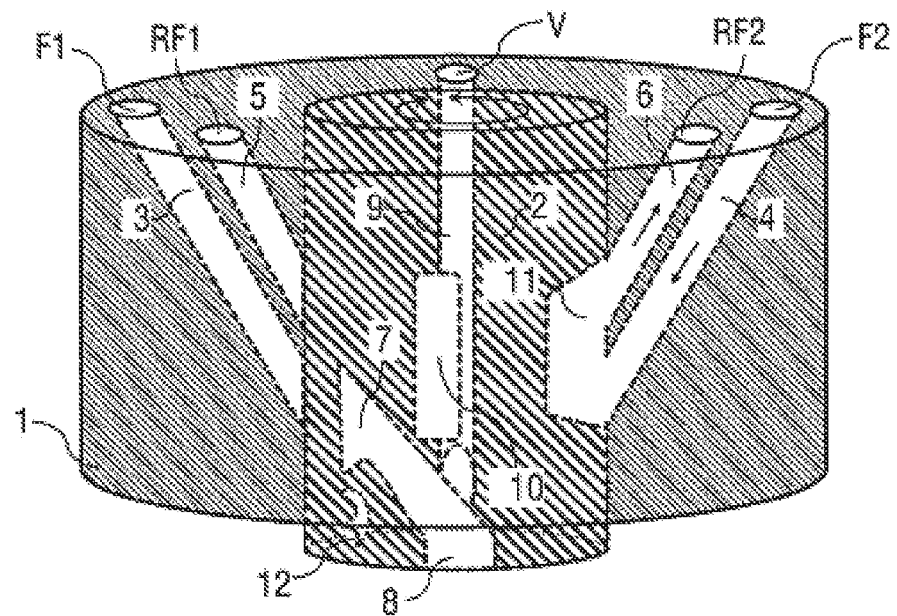
FIG. 2A shows the coating agent valve according to FIGS. 1A-1C in a second rotary position for flushing and reloading the second paint.
Figure 2B:
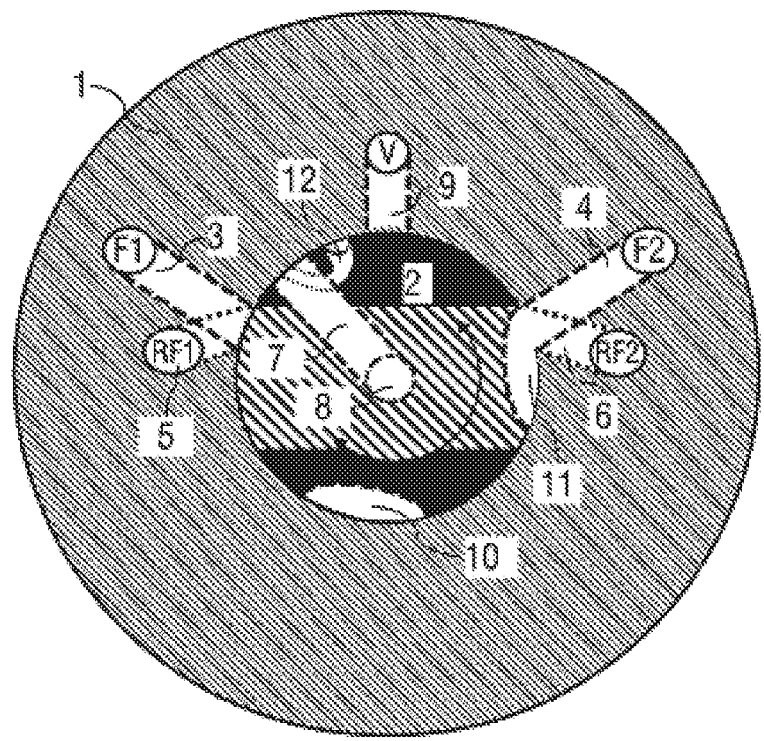
FIG. 2B shows the view in cross-section according to FIG. 1B in the second rotary position.
Figure 2C:
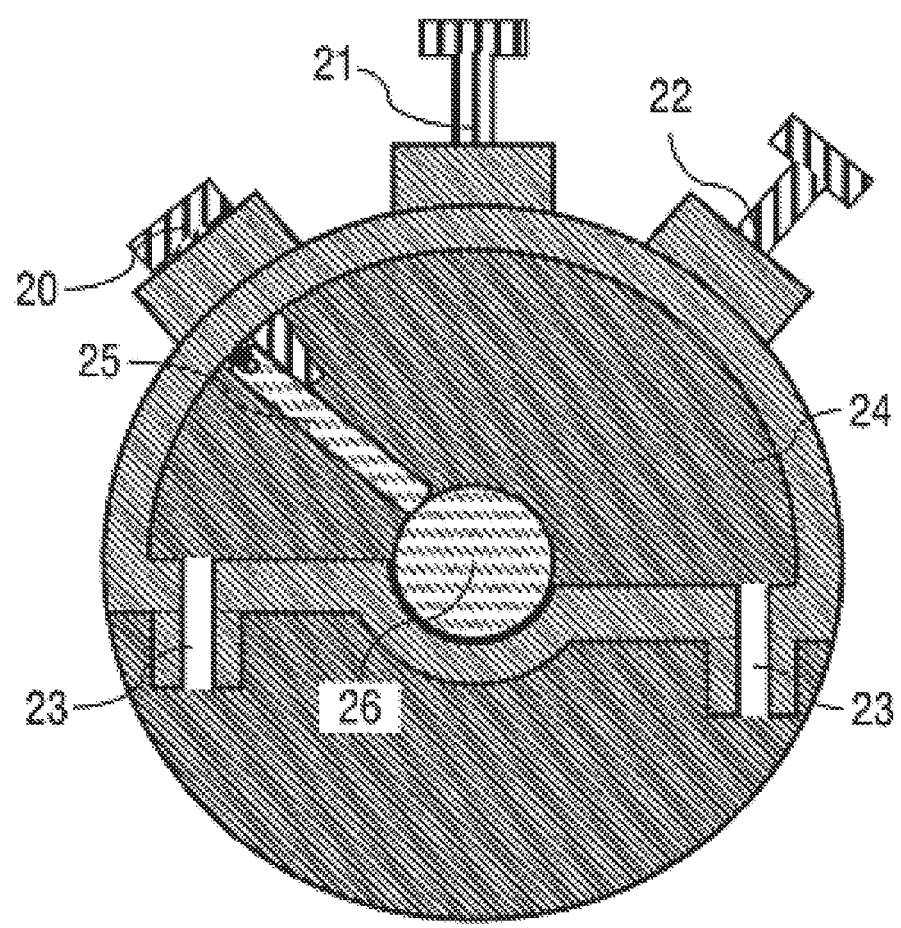
FIG. 2C shows the representation according to FIG. 1C in the second rotary position.

FIGS. 2A-2C on the other hand show a different rotary position of the rotatable valve element 2 in which no paint is applied, but only flushing can be carried out and new paint can be reloaded via the paint inlet F2.

In this rotary position of the rotatable valve element, the paint duct 3 and the return duct 5 are blocked off by the outer casing surface of the rotatable valve element 2.

The recess 11 in the outer casing surface of the rotatable valve element 2 on the other hand effects a fluid connection between the paint duct 4 and the return duct 6.

Figure 3A:
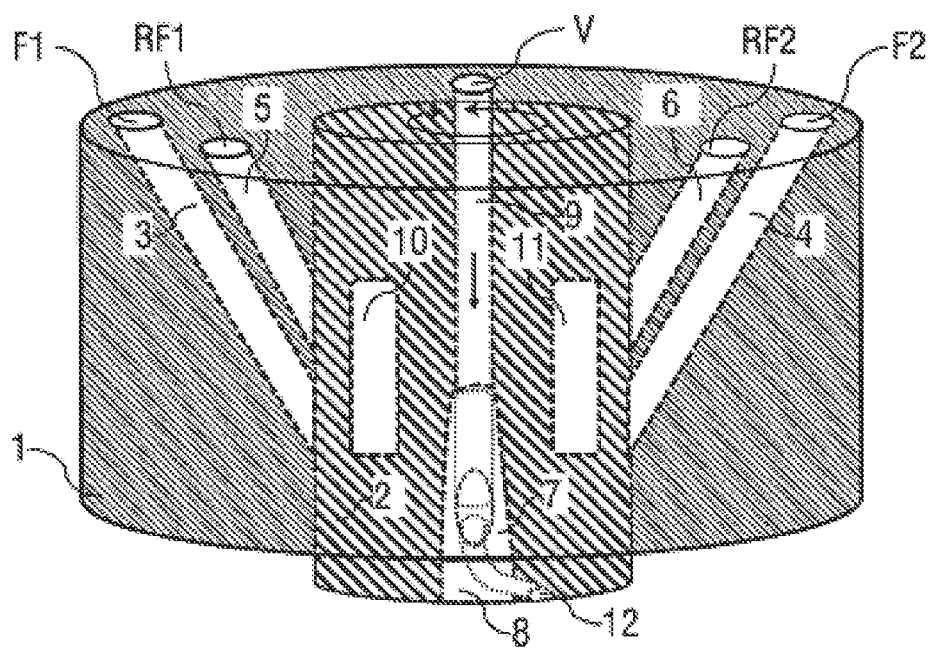
FIGS. 3A-3C are corresponding representations in a third rotary position for flushing the paint nozzle and bell cup.
Figure 3B:
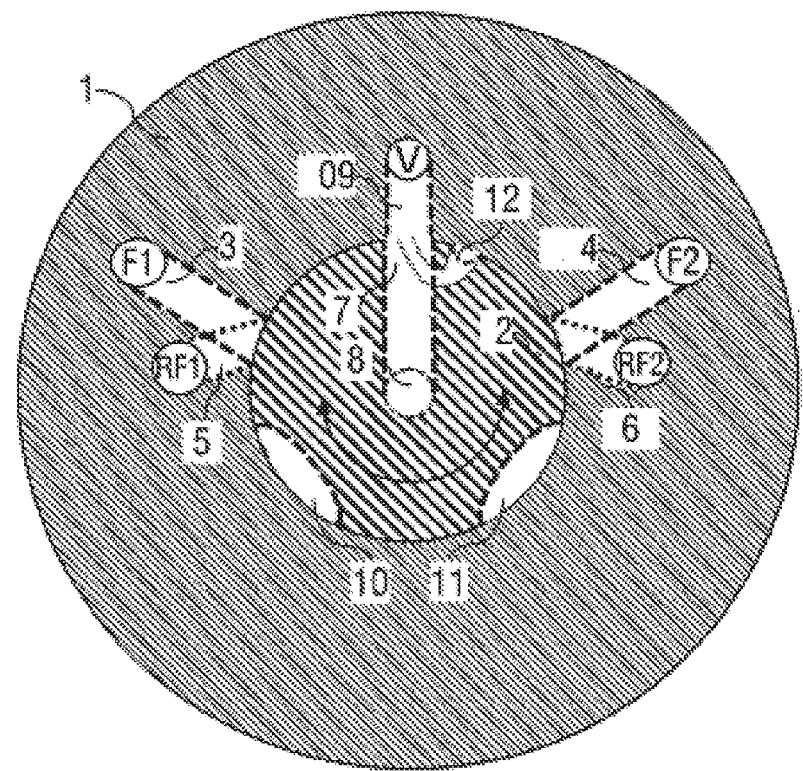
Figure 3C:
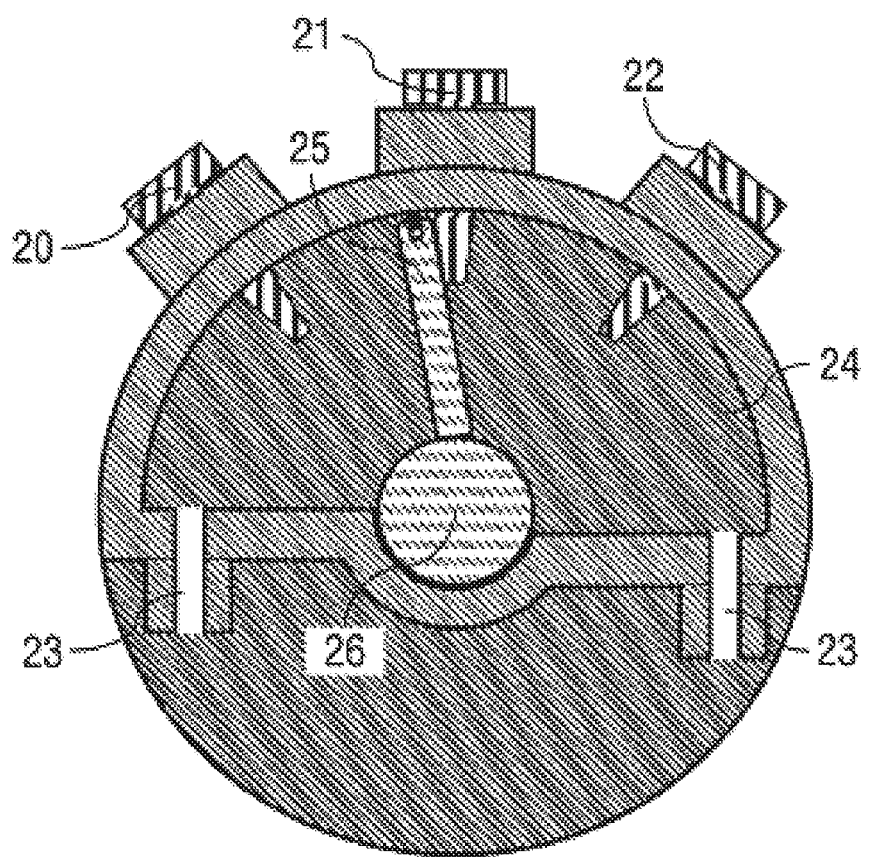

In the rotary position according to FIGS. 3A-3C, on the other hand, the paint nozzle of the rotary atomiser is to be flushed.

The rotatable valve element 2 then blocks off the two paint ducts 3, 4 and the two return ducts 5, 6 with its outer casing surface.

However, the branch bore 7 then effects a fluid connection with the flushing agent duct 9, so that flushing agent can flow from the flushing agent inlet V to the outlet 8.

Figure 4A:
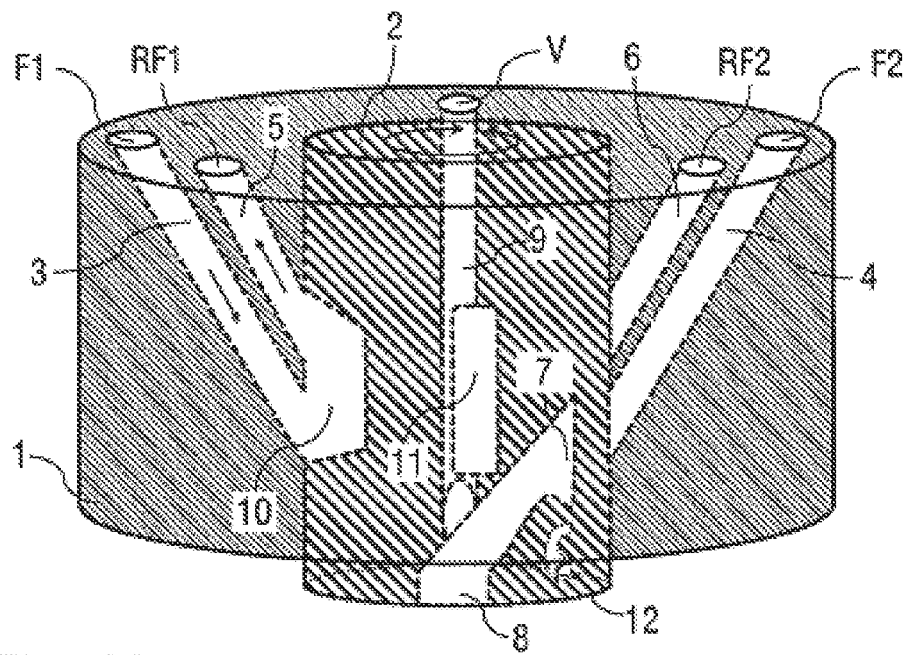
FIGS. 4A-4C are corresponding representations in a fourth rotary position for flushing or reloading the first paint.
Figure 4B:
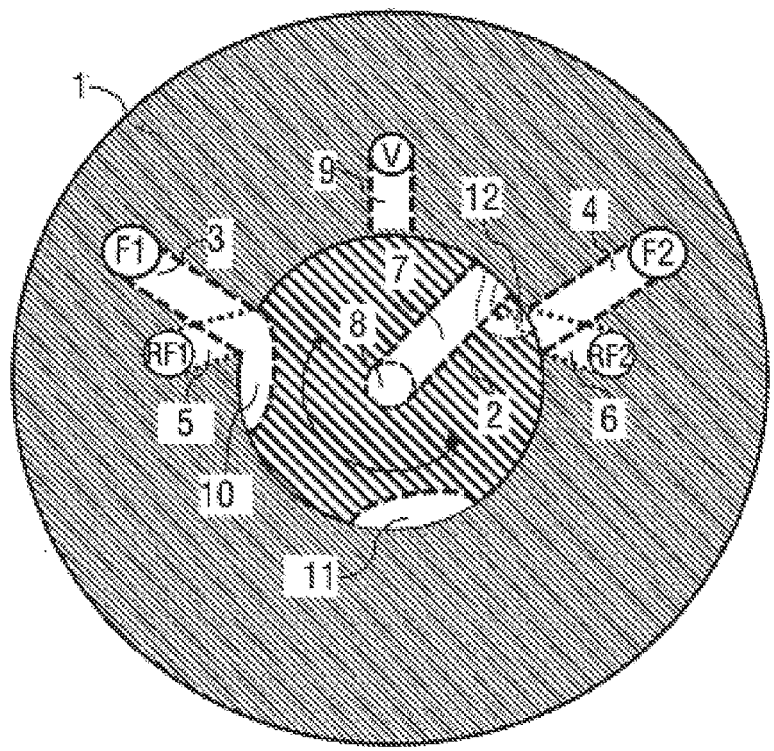
Figure 4C:
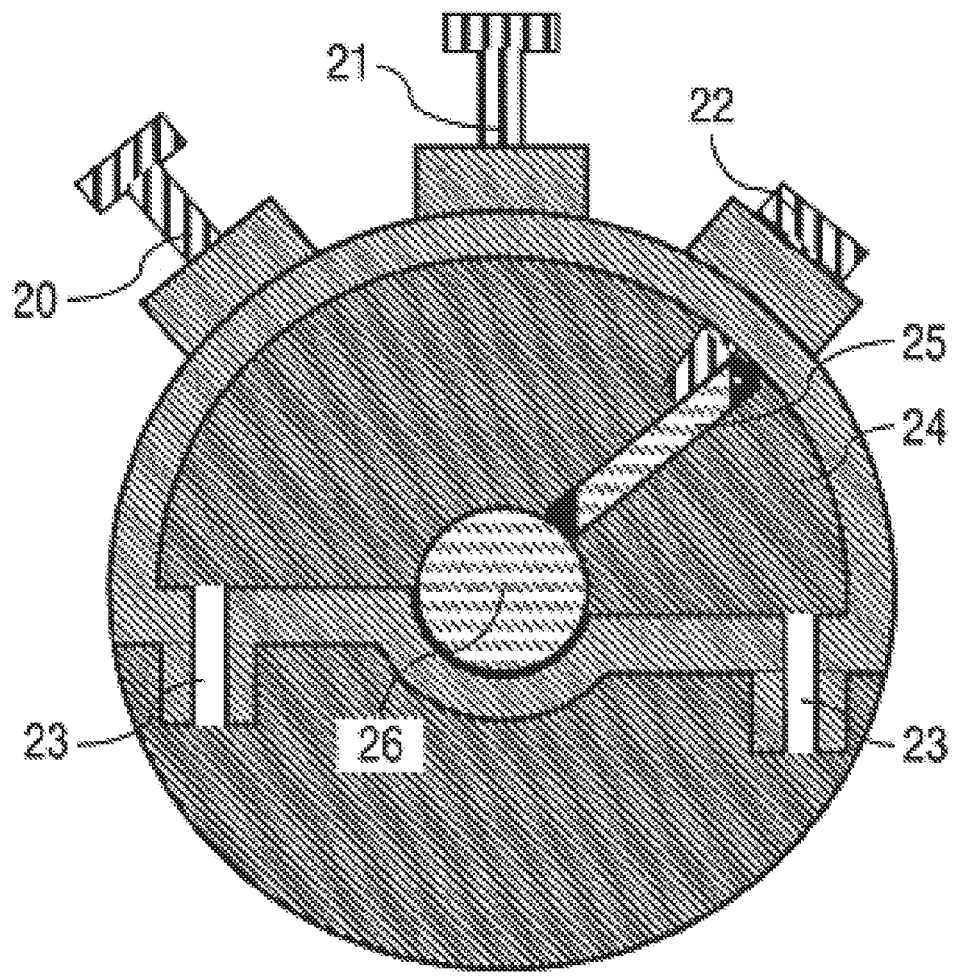

In the rotary position according to FIGS. 4A-4C, on the other hand, flushing and reloading of new paint takes place via the paint inlet F1. In this rotary position, the recess 10 in the casing surface of the rotatable valve element 2 effects a fluid connection between the paint duct 3 and the return duct 5.

However, then the outer casing surface of the rotatable valve element 2 seals off the orifice openings of the paint duct 4 and the return duct 8.

Furthermore, the rotatable valve element 2 then also seals off the orifice opening of the flushing agent duct in the inner wall of the hollow paint tube 1 with its outer casing surface, so that no flushing agent can flow out of the flushing agent duct 9 to the outlet 8.

Figure 5A:
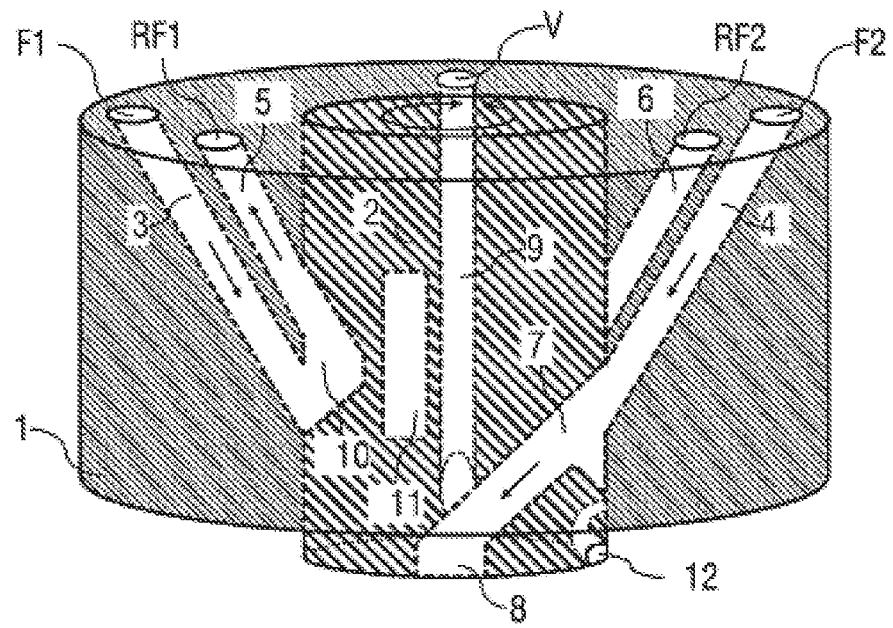
FIGS. 5A-5C are corresponding representations in a fifth rotary position for flushing or reloading the first paint and for painting with the second paint.
Figure 5B:
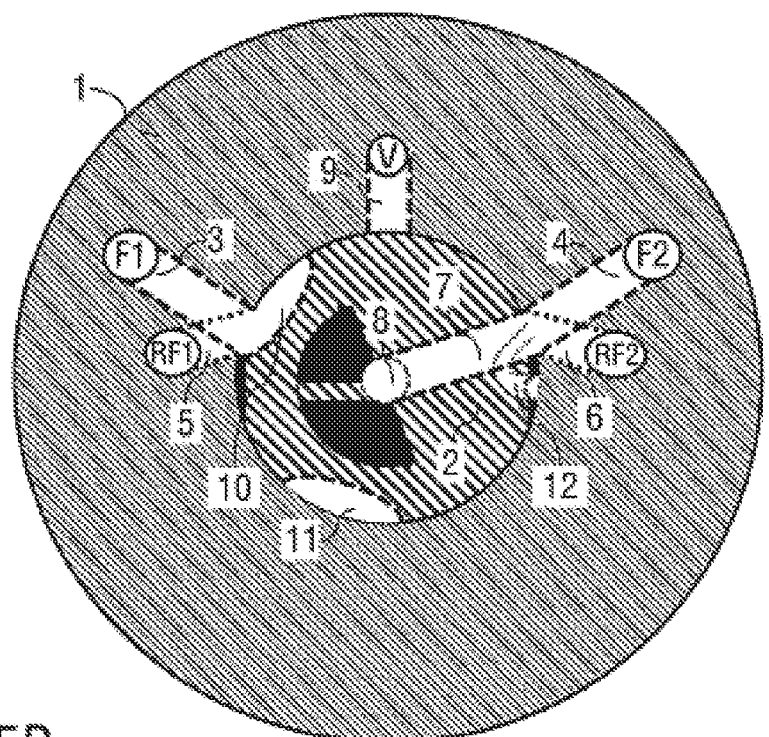
Figure 5C:
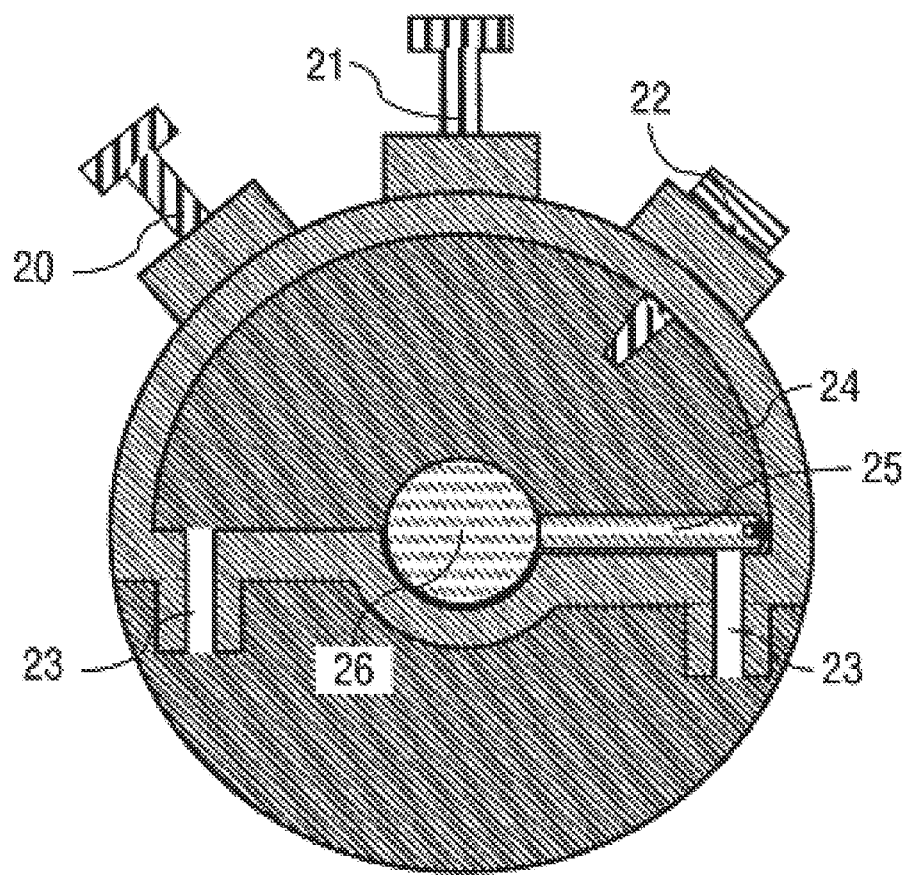

In the rotary position according to FIGS. 5A-5C, on the other hand, provision is made for flushing to be carried out and a new paint to be refilled via the paint inlet F1, whereas at the same time paint is applied via the paint insert F2.

The recess 10 in the outer casing surface of the rotatable valve element 2 then effects a fluid connection between the paint duct 3 and the return duct 5 in order to permit circulation of material.

The branch bore 7 in the rotatable valve element 2 on the other hand then effects a fluid connection with the paint duct 4, so that the paint can flow from the paint inlet F2 through the paint duct 4 and the branch bore 7 to the outlet 8.

FIGS. 1C, 2C, 3C, 4C, 5C in this case show in each case the associated rotary positions of the pivoting vane 25 and the activation state of the angle-of-rotation stops 20-22.

Figure 7:
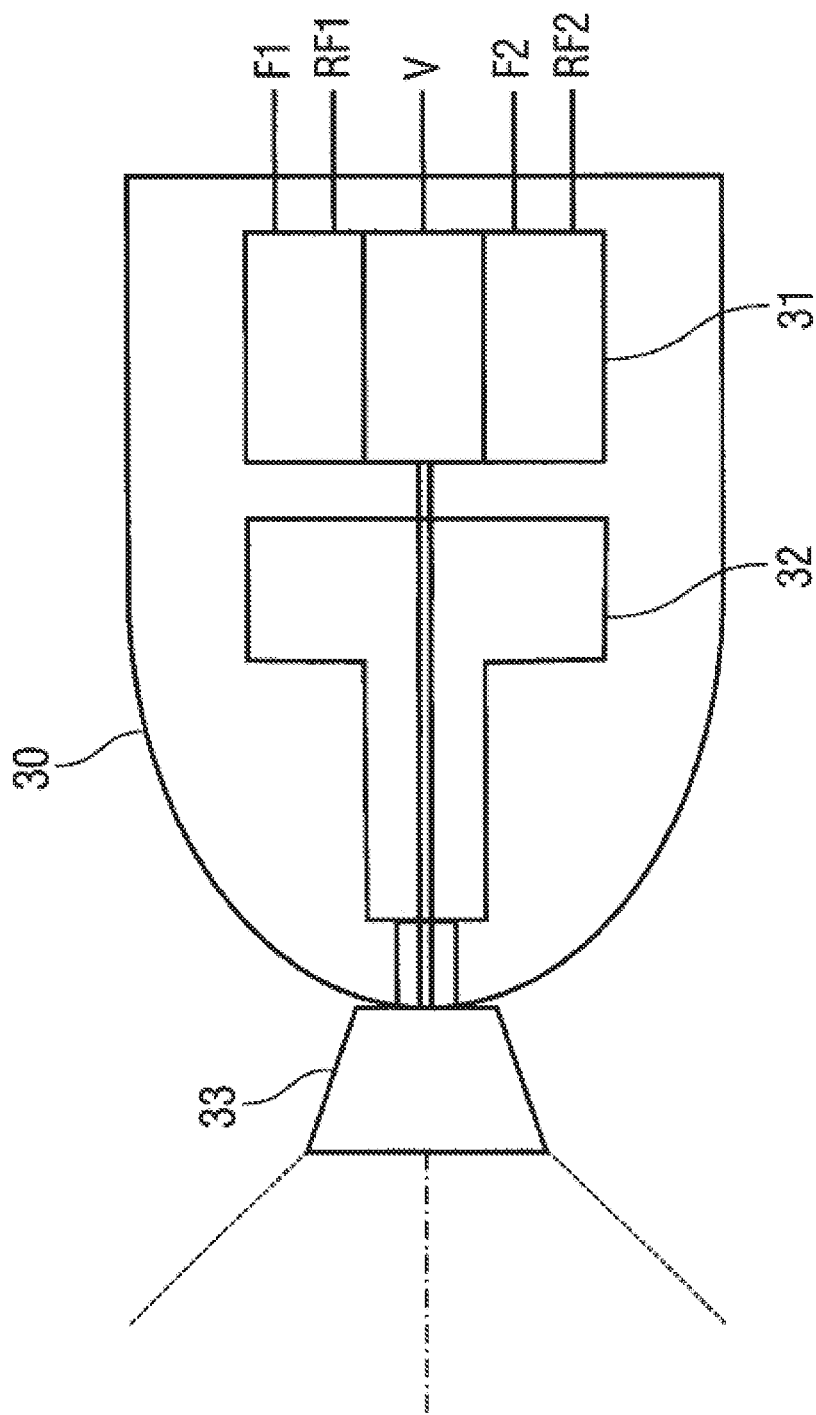
FIG. 7 is a simplified, schematic representation of a rotary atomiser according to the disclosure having a coating agent valve according to the disclosure.

Finally, FIG. 7 shows a grossly simplified representation of a rotary atomiser 30 according to the disclosure which is equipped with a coating agent valve 31 according to the disclosure as the main valve. The representation in this case serves only to make clear the function of the coating agent valve 31, and does not reflect any configuration which is realised in practice.

In the rotary atomiser 30 there is also a turbine 32 for turning a bell cup 33. The coating agent valve 31 in this case selects one of the two paint inlets F1, F2 and then allows the paint waiting there on to the bell cup 33 for application. Furthermore, the coating agent valve 31 also permits the selection of flushing agent at the flushing agent inlet V to allow it on to the bell cup 33.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A coating agent valve, comprising:
a valve drive for turning a valve element, the coating agent valve for controlling a stream of a coating agent in an atomizer that controls the stream of coating agent dependent on a position of the valve element, wherein the valve element is rotatable and wherein the valve drive has a drive chamber which surrounds the rotation spindle of the rotatable valve element in an annular manner at least in part,
b) the rotatable valve element is connected mechanically to a pivoting vane which is pivotable in the drive chamber, so that pivoting of the pivoting vane leads to a corresponding rotation of the valve element, and
c) a first drive air inlet opens into the drive chamber in order to turn the pivoting vane and hence also the valve element in a first direction of rotation, and
d) a second drive air inlet opens into the drive chamber in order to turn the pivoting vane and hence also the valve element in a second direction of rotation, the second direction of rotation being opposed to the first direction of rotation;
e) a plurality of angle-of-rotation stops which limit a pivot angle of the pivoting vane in each case at various angular positions are provided, and
f) the angle-of-rotation stops can be activated and deactivated in each case, with the angle-of-rotation stops in an activated position limiting the pivot angle of the pivoting vane, whereas the angle-of-rotation stops in a deactivated position do not limit the pivot angle of the pivoting vane.

2. The coating agent valve according to claim 1, further comprising:
a) a first coating agent inlet for supplying a first coating agent,
b) a second coating agent inlet for supplying a second coating agent, and
c) a coating agent outlet for delivering either the first coating agent or the second coating agent, the rotatable valve element connecting the coating agent outlet either to the first coating agent inlet or to the second coating agent inlet dependent on its rotary position.

3. The coating agent valve according to claim 2, further comprising:
a) a first return means for returning the first coating agent, the rotatable valve element either blocking off the first return means or connecting it to the first coating agent inlet dependent on its rotary position,
b) a second return means for returning the second coating agent, the rotatable valve element either blocking off the second return means or connecting it to the second coating agent inlet dependent on its rotary position.

4. The coating agent valve according to claim 3, further comprising:
a) a flushing agent inlet for supplying a flushing agent,
b) the rotatable valve element either blocking off the flushing agent inlet or connecting it to the coating agent outlet, and
c) the rotatable valve element either blocking off the flushing agent inlet or connecting it to an external flushing duct for externally flushing a bell cup.

5. The coating agent valve according to claim 4, further comprising:
a) a first rotary position of the rotatable valve element, in which the rotatable valve element
a1) connects the first coating agent inlet to the coating agent outlet in order to apply the first coating agent,
a2) blocks off the first return means,
a3) connects the second coating agent inlet to the second return means in order to reload the second coating agent, and
a4) blocks off the flushing agent inlet,
b) a second rotary position of the rotatable valve element, in which the rotatable valve element
b1) blocks off the first coating agent inlet,
b2) blocks off the first return means,
b3) connects the second coating agent inlet to the second return means in order to reload the second coating agent, and
b4) blocks off the flushing agent inlet,
c) a third rotary position of the rotatable valve element, in which the rotatable valve element
c1) blocks off the first coating agent inlet,
c2) blocks off the first return means,
c3) blocks off the second coating agent inlet,
c4) blocks off the second return means, and
c5) connects the flushing agent inlet to at least one of the coating agent outlet and the external flushing duct,
d) a fourth rotary position of the rotatable valve element, in which the rotatable valve element
d1) connects the first coating agent inlet to the first return means,
d2) blocks off the second coating agent inlet,
d3) blocks off the second return means, and
d4) blocks off the flushing agent inlet,
e) a fifth rotary position of the rotatable valve element, in which the rotatable valve element
e1) connects the first coating agent inlet to the first return means,
e2) connects the second coating agent inlet to the coating agent outlet,
e3) blocks off the second return means, and
e4) blocks off the flushing agent inlet.

6. The coating agent valve according to claim 4, wherein
a) the rotatable valve element is shaped substantially cylindrically and is arranged rotatably in a hollow-cylindrical paint tube, and
b) the first coating agent inlet feeds a first coating agent duct which runs in the wall of the paint tube,
c) the first return means is fed from a second coating agent duct which runs in the wall of the paint tube,
d) the second coating agent inlet feeds a third coating agent duct which runs in the wall of the paint tube,
e) the second return means is fed from a fourth coating agent duct which runs in the wall of the paint tube,
f) the flushing agent inlet feeds a fifth coating agent duct which runs in the wall of the paint tube, and
g) the coating agent outlet is arranged in the rotatable valve element.

7. The coating agent valve according to claim 6, wherein
a) the first coating agent duct which starts from the first coating agent inlet opens into the inner wall of the paint tube at the same angle at circumference as the second coating agent duct from the first return means,
b) the first coating agent duct which starts from the first coating agent inlet opens into the inner wall of the paint tube axially offset to the second coating agent duct which starts from the first return means,
c) the third coating agent duct which starts from the second coating agent inlet opens into the inner wall of the paint tube at the same angle and circumference as the fourth coating agent duct which starts from the second return means, d) the third coating agent duct which starts from the second coating agent inlet opens into the inner wall of the paint tube axially offset to the fourth coating agent duct which starts from the second return means, and e) the first coating agent duct and the second coating agent duct on one hand and the third coating agent duct and the fourth coating agent duct on the other hand open into the inner wall of the paint tube at different angles and circumference.

8. The coating agent valve according to claim 7, wherein a) a branch bore runs in the rotatable valve element, which bore starts from the outer casing surface of the valve element and opens into the coating agent outlet, and b) in that the branch bore in the rotatable valve element can be fed with the first coating agent from the first coating agent duct or with the second coating agent from the third coating agent duct dependent on the rotary position of the valve element.

9. The coating agent valve according to claim 8, wherein a) the rotatable valve element has in its outer casing surface a first recess which extends in the axial direction, b) the first recess connects the first coating agent duct to the second coating agent duct dependent on the rotary position, c) the rotatable valve element has in its outer casing surface a second recess which extends in the axial direction, d) the second recess connects the third coating agent duct to the fourth coating agent duct dependent on the rotary position.

10. The coating agent valve according to claim 8, wherein a) a flushing agent outlet is arranged in the rotatable valve element for delivering flushing agent for external flushing of a bell cup of a rotary atomiser, and b) the flushing agent outlet is connected to the branch bore in the rotatable valve element, and c) the flushing agent outlet is connected to an external flushing duct of a rotary atomiser which guides the flushing agent onto the outer casing surface of the bell cup.

11. The coating agent valve according to claim 1, wherein a) the angle-of-rotation stops in each case have a slider, b) the slider in the activated position is pushed into the drive chamber and blocks the pivoting vane, and c) the slider in the deactivated position is drawn out of the drive chamber and does not block the pivoting vane.

12. The coating agent valve according to claim 1, wherein a) a circulation of material of the coating agent through the coating agent valve takes place, and b) the coating agent valve either enables or blocks the circulation of material dependent on the rotary position of the rotatable valve element.

13. An application device for the application of a coating agent, having a coating agent valve according to claim 1.

14. The application device according to claim 1, wherein the coating agent valve is a main valve, so that no further valve is located downstream after the coating agent valve.

15. The application device according to claim 14, wherein the application device does not have an additional short flushing valve in order to flush line volumes downstream after the coating agent valve.

16. A coating agent valve for controlling a stream of a coating agent in an application device comprising a movable valve element which controls the stream of a coating agent dependent on its position wherein the valve element is rotatable the coating agent valve including:

a) a first coating agent inlet for supplying a first coating agent, b) a second coating agent inlet for supplying a second coating agent, and c) a coating agent outlet for delivering either the first coating agent or the second coating agent, the rotatable valve element connecting the coating agent outlet either to the first coating agent inlet or to the second coating agent inlet dependent on its rotary position, d) a first return means for returning the first coating agent, the rotatable valve element either blocking off the first return means or connecting it to the first coating agent inlet dependent on its rotary position, e) a second return means for returning the second coating agent, the rotatable valve element either blocking off the second return means or connecting it to the second coating agent inlet dependent on its rotary position, f) a flushing agent inlet for supplying a flushing agent, g) the rotatable valve element either blocking off the flushing agent inlet or connecting it to the coating agent outlet, and h) the rotatable valve element either blocking off the flushing agent inlet or connecting it to an external flushing duct for externally flushing the bell cup, i) a first rotary position of the rotatable valve element, in which the rotatable valve element a1) connects the first coating agent inlet to the coating agent outlet in order to apply the first coating agent, a2) blocks off the first return means, a3) connects the second coating agent inlet to the second return means in order to reload the second coating agent, and a4) blocks off the flushing agent inlet, j) a second rotary position of the rotatable valve element, in which the rotatable valve element b1) blocks off the first coating agent inlet, b2) blocks off the first return means, b3) connects the second coating agent inlet to the second return means in order to reload the second coating agent, and b4) blocks off the flushing agent inlet, k) a third rotary position of the rotatable valve element, in which the rotatable valve element c1) blocks off the first coating agent inlet, c2) blocks off the first return means, c3) blocks off the second coating agent inlet, c4) blocks off the second return means, and c5) connects the flushing agent inlet to at least one of the coating agent outlet and the external flushing duct, l) a fourth rotary position of the rotatable valve element, in which the rotatable valve element d1) connects the first coating agent inlet to the first return means, d2) blocks off the second coating agent inlet, d3) blocks off the second return means, and d4) blocks off the flushing agent inlet, m) a fifth rotary position of the rotatable valve element, in which the rotatable valve element e1) connects the first coating agent inlet to the first return means, e2) connects the second coating agent inlet to the coating agent outlet, e3) blocks off the second return means, and e4) blocks off the flushing agent inlet wherein the rotatable valve element is shaped substantially cylindrically and is arranged rotatably in a hollow-cylindrical paint tube, and the first coating agent inlet feeds a first coating agent duct which runs in the wall of the paint tube, the first return means is fed from a second coating agent duct which runs in the wall of the paint tube, the second coating agent inlet feeds a third coating agent duct which runs in the wall of the paint tube, the second return means is fed from a fourth coating agent duct which runs in the wall of the paint tube, the flushing agent inlet feeds a fifth coating agent duct which runs in the wall of the paint tube, and the coating agent outlet is arranged in the rotatable valve element.

17. The coating agent valve according to claim 16, wherein
   a) the first coating agent duct which starts from the first coating agent inlet opens into the inner wall of the paint tube at the same angle at circumference as the second coating agent duct from the first return means,
   b) the first coating agent duct which starts from the first coating agent inlet opens into the inner wall of the paint tube axially offset to the second coating agent duct which starts from the first return means,
   c) the third coating agent duct which starts from the second coating agent inlet opens into the inner wall of the paint tube at the same angle at circumference as the fourth coating agent duct which starts from the second return means,
   d) the third coating agent duct which starts from the second coating agent inlet opens into the inner wall of the paint tube axially offset to the fourth coating agent duct which starts from the second return means, and
   e) the first coating agent duct and the second coating agent duct on one hand and the third coating agent duct and the fourth coating agent duct on the other hand open into the inner wall of the paint tube at different angles at circumference.

18. The coating agent valve according to claim 17, wherein
   a) a branch bore runs in the rotatable valve element, which bore starts from the outer casing surface of the valve element and opens into the coating agent outlet, and
   b) in that the branch bore in the rotatable valve element can be fed with the first coating agent from the first coating agent duct or with the second coating agent from the third coating agent duct dependent on the rotary position of the valve element.

19. The coating agent valve according to claim 18, wherein
   a) the rotatable valve element has in its outer casing surface a first recess which extends in the axial direction,
   b) the first recess connects the first coating agent duct to the second coating agent duct dependent on the rotary position,
   c) the rotatable valve element has in its outer casing surface a second recess which extends in the axial direction,
   d) the second recess connects the third coating agent duct to the fourth coating agent duct dependent on the rotary position.

20. The coating agent valve according to claim 18, wherein
   a) a flushing agent outlet is arranged in the rotatable valve element for delivering flushing agent for external flushing of a bell cup of a rotary atomiser, and
   b) the flushing agent outlet is connected to the branch bore in the rotatable valve element, and
   c) the flushing agent outlet is connected to an external flushing duct of a rotary atomiser which guides the flushing agent onto the outer casing surface of the bell cup.

* * * * *